US012737225B2

(12) United States Patent
Zhang et al.

(10) Patent No.: US 12,737,225 B2
(45) Date of Patent: Sep. 15, 2026

(54) SERVICE UPDATE MANAGEMENT

(71) Applicant: INTERNATIONAL BUSINESS MACHINES CORPORATION, Armonk, NY (US)

(72) Inventors: Wen Tao Zhang, Beijing (CN); Yiwen Huang, Markham (CA); Yang Yang, Beijing (CN); Hong Jun Tu, Beijing (CN); Xiao Kai Dong, Beijing (CN); Ye Cui, Beijing (CN); Wei Wu, Beijing (CN); Yu Chi Zhang, Beijing (CN); Xin Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 17/591,179

(22) Filed: Feb. 2, 2022

(65) Prior Publication Data

US 2023/0244528 A1 Aug. 3, 2023

(51) Int. Cl.
*G06F 9/50* (2006.01)
*G06F 8/65* (2018.01)

(52) U.S. Cl.
CPC .............. *G06F 9/5016* (2013.01); *G06F 8/65* (2013.01); *G06F 9/5022* (2013.01); *G06F 9/5044* (2013.01)

(58) Field of Classification Search
CPC ............... G06F 9/524; G06F 9/50; G06F 8/65
(Continued)

(56) References Cited

U.S. PATENT DOCUMENTS 10,528,337 B1 1/2020 Varadharajan Kannan
10,805,275 B1 * 10/2020 Huang .................. H04L 67/02
(Continued)

FOREIGN PATENT DOCUMENTS

CN 111752641 A 10/2020
CN 111767113 A 10/2020
(Continued)

OTHER PUBLICATIONS

Anonymous, "Kubernetes—Rolling Updates", Guides, Mar. 7, 2023, 7 pages.

(Continued)

*Primary Examiner* — Pierre Vital
*Assistant Examiner* — Jordan Scott Motter
(74) *Attorney, Agent, or Firm* — Jordan T. Schiller

(57) ABSTRACT

The invention discloses a method, system, and computer program product for service update management. The method, during a first update procedure for a first service in a computing system, in response to a detection that the first update procedure fails, a state of a second service on which the first service depends in the computing system is checked. In response to the second service being in a first state, the first update procedure is suspended. Resources allocated to the first update procedure by the computing system are released. The released resources are allocated to the second update procedure of the second service. The second update procedure is implemented based on the allocated released resources. With these embodiments, failures during the update procedures for the services may be automatically detected and removed based on a dependency relationship between the services. Therefore, the performance of the update procedures may be increased.

20 Claims, 6 Drawing Sheets

(58) Field of Classification Search
USPC .......................................................... 718/104
See application file for complete search history.

(56) References Cited

U.S. PATENT DOCUMENTS

| | | | | |
|---|---|---|---|---|
| 2006/0053305 | A1* | 3/2006 | Wahlert | G06F 11/1451 713/189 |
| 2007/0118838 | A1* | 5/2007 | Tsujino | G06F 9/4881 718/103 |
| 2007/0143766 | A1* | 6/2007 | Farchi | G06F 9/524 718/104 |
| 2010/0174946 | A1* | 7/2010 | Burdick | G06F 9/3851 714/38.14 |
| 2013/0013833 | A1* | 1/2013 | Nagpal | G06F 13/14 710/200 |
| 2013/0232496 | A1* | 9/2013 | Zoll | G06F 9/524 718/103 |
| 2014/0201564 | A1* | 7/2014 | Jagtiani | G06F 11/1484 714/4.11 |
| 2016/0026672 | A1* | 1/2016 | Zhang | G06F 16/13 707/686 |
| 2016/0124741 | A1* | 5/2016 | Hu | H04L 67/34 717/171 |
| 2017/0149864 | A1* | 5/2017 | Feiman | H04L 67/10 |
| 2017/0168797 | A1* | 6/2017 | Pogrebinsky | G06F 8/65 |
| 2019/0294504 | A1* | 9/2019 | Giannetti | G06F 9/451 |
| 2021/0072966 | A1 | 3/2021 | Zong | |
| 2021/0294596 | A1* | 9/2021 | Ashirvad | H04L 41/142 |

FOREIGN PATENT DOCUMENTS

| | | | |
|---|---|---|---|
| CN | 112328359 | A | 2/2021 |
| WO | 2023/148020 | A1 | 8/2023 |

OTHER PUBLICATIONS

Anonymous, "Kubernetes Demystified: Solving Service Dependencies", Community, Mar. 7, 2023, 9 pages.

International Search Report and Written Opinion, International Application No. PCT/EP2023/051385, International Filing Date: Jan. 20, 2023, Mailing Date: Mar. 20, 2023, 11 pages.

Maharjan, "How Rolling and Rollback Deployments work in Kubernetes", Oct. 25, 2020, 12 pages.

Disclosed Anonymously, "Kubernetes Troubleshooting Walkthrough—Pod Failure CrashLoopBackOff", Kubernetes.com, Feb. 12, 2019 [accessed on Jan. 4, 2022], 10 pages, Retrieved from the Internet: <URL: https://managedkube.com/kubernetes/pod/failure/crashloopbackoff/k8sbot/troubleshooting/2019/02/12/pod-failure-crashloopbackoff.html>.

Disclosed Anonymously, "Scheduling Policies," Kubernetes.com, Dec. 17, 2021 [accessed on Jan. 4, 2022], 1 page, Retrieved from the Internet: <URL: https://kubernetes.io/docs/reference/scheduling/policies/>.

Lehota, "Automate the deployment of pod dependencies in Kubernetes," IBM Developer, Jul. 2, 2019 [accessed on Jan. 4, 2022], 12 pages, Retrieved from the Internet: <URL: https://developer.ibm.com/articles/automating-deployment-pod-dependencies-in-kubernetes/>.

Mell, et al., "The NIST Definition of Cloud Computing", National Institute of Standards and Technology, Special Publication 800-145, Sep. 2011, 7 pages.

* cited by examiner 600
510
API SERVER
610
520
DETECTOR
640
530
STATE OBJECT
{
DEPLOYMENT: B;
DEPENDENT SERVICE:
[{SERVICE: A,
STATE: ""}]
}
630
620
410
SERVICE A
412
DEPLOYMENT
414
OLD INSTANCE
416
OLD INSTANCE
418
NEW PENDING INSTANCE
420
SERVICE B
422
DEPLOYMENT
424
OLD INSTANCE
426
OLD INSTANCE
428
FAILED INSTANCE

SERVICE UPDATE MANAGEMENT

BACKGROUND

The present invention relates to service update management, and more specifically, to methods, systems, and computer program products for managing service update procedures for services that have a dependency relationship.

Nowadays, a great number of services are developed based on a micro service architecture, and it becomes a popular way to implement a distributed application system based on a plurality of services. Specifically, the Kubernetes cluster provides an architecture within which the great number of services may be deployed, and then these services may be accessed by the distributed application. During developments of a distributed application system that consists of the plurality of services in the Kubernetes cluster, rolling upgrade is used to ensure business continuity. In the rolling update, old instances and new instances associated with the plurality of services coexist in the developing environment. Therefore, the number of active instances (including the old and new ones) almost doubles in the developing environment, which in turn causes a shortage of resources in the developing environment. At this point, how to manage the service update in an easy and effective way becomes a hot focus.

SUMMARY

In a first aspect of the present invention, there is provided a computer-implemented method that may be implemented by one or more processors in a computing system. In the method, during a first update procedure for a first service in a computing system, in response to a detection that the first update procedure is failed, the computing system checks a state of a second service on which the first service depends in the computing system. In response to the second service being in a first state which indicates that a second update procedure of the second service is waiting for the computing system to allocate resources, the computing system suspends the first update procedure. The computing system releases resources allocated to the first update procedure by the computing system. The computing system allocates the released resources to the second update procedure of the second service. The computing system implements the second update procedure based on the allocated released resources. With these embodiments, failures during the update procedures for the services may be automatically detected and removed based on a dependency relationship between the services. Therefore, performance of the update procedures may be increased.

According to embodiments of the present invention, in response to the second update procedure being executed but not finished, the computing system updates the state of the second service to a second state which indicates that the second update procedure of the second service is executing; and in response to the second update procedure being finished, the computing system updates the state of the second service to a third state which indicates that the second update procedure of the second service is finished. With these embodiments, the state of the second service may provide an easy and effective way for determining whether the second service has been updated to the latest version. Therefore, a state change of the second service from the second state to the third state may trigger the suspended first service to be recovered to a normal state.

According to embodiments of the present invention, the computing system continues suspending the first update procedure; in response to the second service being in the third state, the computing system allocates resources to the first update procedure of the first service; and the computing system continues the first update procedure based on the allocated resources. With these embodiments, once the second service turns into the third state, it indicates that the second update process is finished and then resources allocated to the second update procedure may be released. At this point, the computing system has enough resources to allocate to the first update procedure. Therefore, the time point for recovering the first update procedure may be determined effectively and automatically.

According to embodiments of the present invention, the first and second services are developed based on a Kubernetes architecture, and the second service is provided by at least one instance that is defined in a Kubernetes deployment of the second service. With these embodiments, services that are developed based on the Kubernetes architecture may be automatically updated without complicated manual labors by developing engineers.

According to embodiments of the present invention, the first state which indicates that the second update procedure of the second service is waiting for the computing system to allocate resources comprises a state which indicates that at least one instance of the second service is waiting for the computing system to allocate resources. With these embodiments, the service may be managed in a level of the instance, which provides an accurate way for the service update management.

According to embodiments of the present invention, the computing system allocates the released resources to the at least one instance. With these embodiments, each instance included in the service may be managed in an individual way, and thus the whole update procedure may be controlled effectively.

According to embodiments of the present invention, the computing system is provided in a developing environment, in which resources of the computing system are not enough for supporting both of the first update procedure and the second update procedure. As the resources in the developing environment are limited while the service update procedures may cost about twice resources required for the normal operation. Therefore, the problem of insufficient resources often occurs in the developing environment. With these embodiments, failures may be automatically detected during the update procedures, and thus the heavy manual labor of the developing engineer may be reduced.

In a second aspect of the present invention, there is provided a computer-implemented system. The computer-implemented system comprises a computer processor coupled to a computer-readable memory unit, where the memory unit comprises instructions that when executed by the computer processor implements the method according to the first aspect of the present invention.

In a third aspect of the present invention, there is provided a computer program product. The computer program product comprises a computer readable storage medium having program instructions embodied therewith. The program instructions are executable by an electronic device to cause the electronic device to perform actions of the method according to the first aspect of the present invention.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
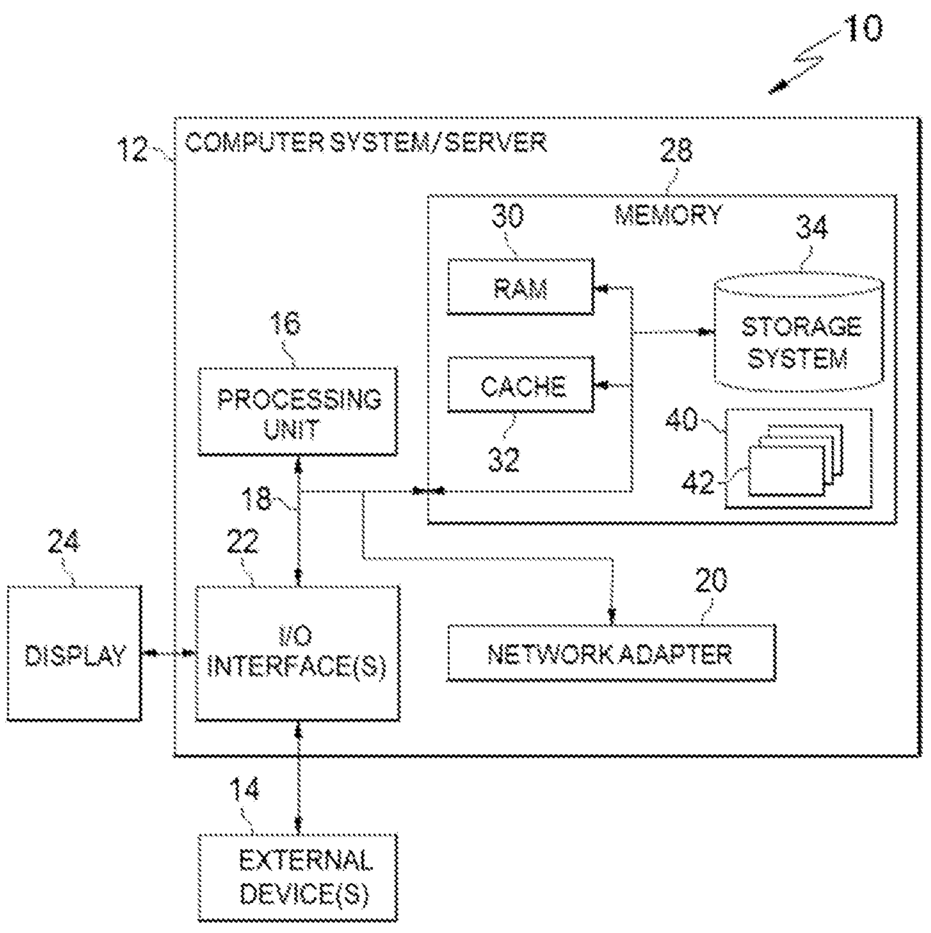
FIG. 1 depicts a cloud computing node according to embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve a plurality of consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and so on.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, database system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival database systems, etc.

Figure 2:
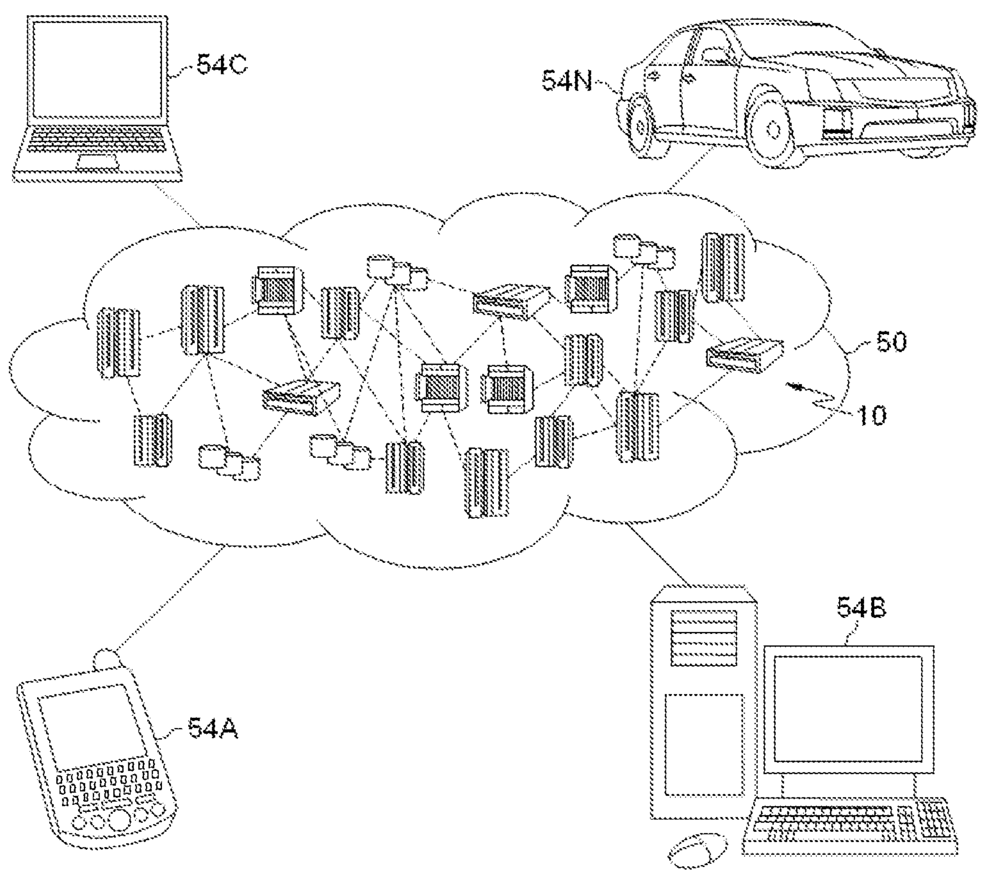
FIG. 2 depicts a cloud computing environment according to embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
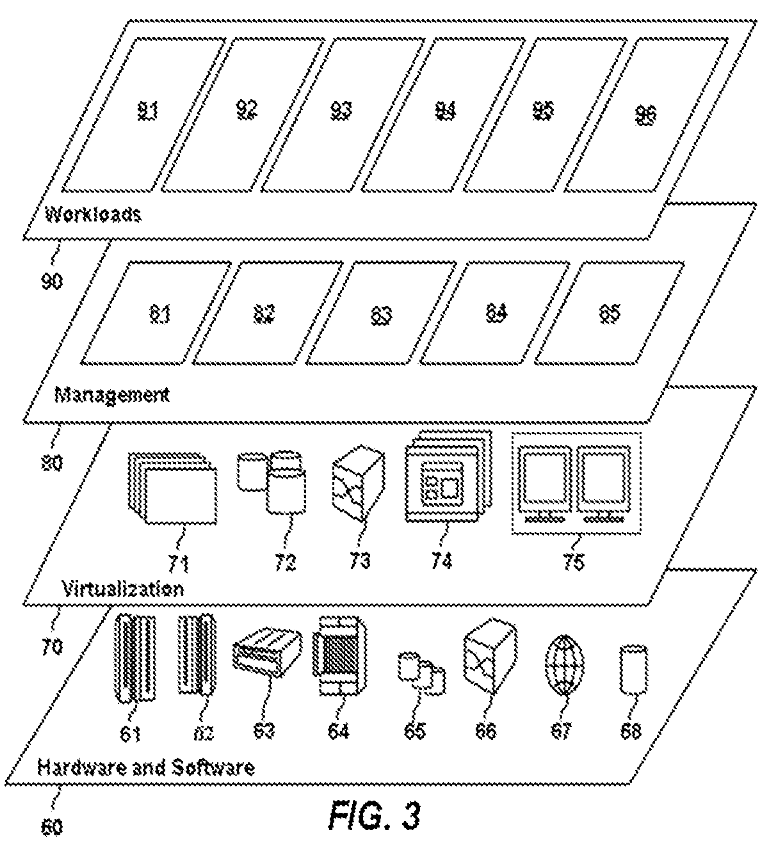
FIG. 3 depicts abstraction model layers according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service update management processing 96.

Figure 4:
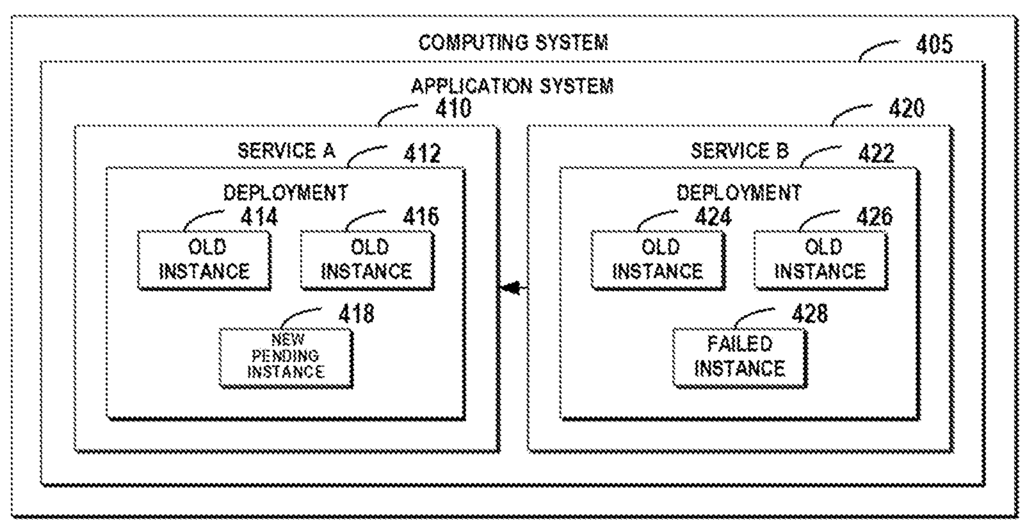
FIG. 4 depicts an example diagram for a dependency relationship between services in a developing environment in which embodiments of the present invention may be implemented.

It should be noted that the service update management processing 96 according to embodiments of the present invention could be implemented by computer system/server 12 of FIG. 1. Reference will be made to FIG. 4 for a brief description of a working environment of the invention. FIG. 4 depicts an example diagram for a dependency relationship between services in a computing system 400 in which embodiments of the present invention may be implemented. Here, the computing system 400 may be a developing system, a runtime system or a cloud system. In the computing system 400, an application system 405 which includes a plurality of services may be run. Here, the application system 405 may relate to a software application system, and services in the application system 405 may call resources in the computing system 400 for providing corresponding functions. In order to simplify the description, an application system 405 that includes only two services with a dependency relationship will be provided as an example. As depicted in FIG. 4, the application system 405 may include a service A 410 and a service B 420, where each of these services is implemented by a corresponding deployment.

Specifically, the service A 410 may be implemented by a deployment 412 including two instances, and the service B 420 may be implemented by a deployment 422 also including two instances. During the development, developing engineers may update codes for the instances and then update the deployed services accordingly. For example, old instances 414 and 416 may be gradually updated into new instances. During the update procedure, one or more new pending instance 418 may coexist with the old instances 414 and 416, and then the one or more new pending instance 418 will replace the corresponding old ones after the new pending instance 418 is completely deployed. However, the one or more new pending instance 418 may cost resources in the computing system 400 on which the service A 410 and service B 420 reside, and then there may be a shortage of available resources in the computing system 400. At this point, some instances (such as the new pending instance 418) have to wait for resource allocations during the update procedure.

FIG. 4 shows a situation where the service B 420 depends on the service A 410, and thus an update procedure for the service B 420 depends on a finish of an update procedure for the service A 410. At the beginning of the update, instances in both of the services A and B may be allocated with some resources for implementing the update. For example, an instance in the service B 420 (such as an old instance 424) may be allocated with resources but cannot continue due to a fact that the dependent service A 410 has not been finished. At this point, the instance 424 with the allocated resources may fail and become a failed instance 428. There are many reasons why the update procedure for the service A 410 is not finished, one of them can be that the computing system 400 does not have enough resources to allocate. In other words, the new pending instance 418 is waiting for available resources but the computing system 400 does not have any resource for allocation.

Figures 5, 6:
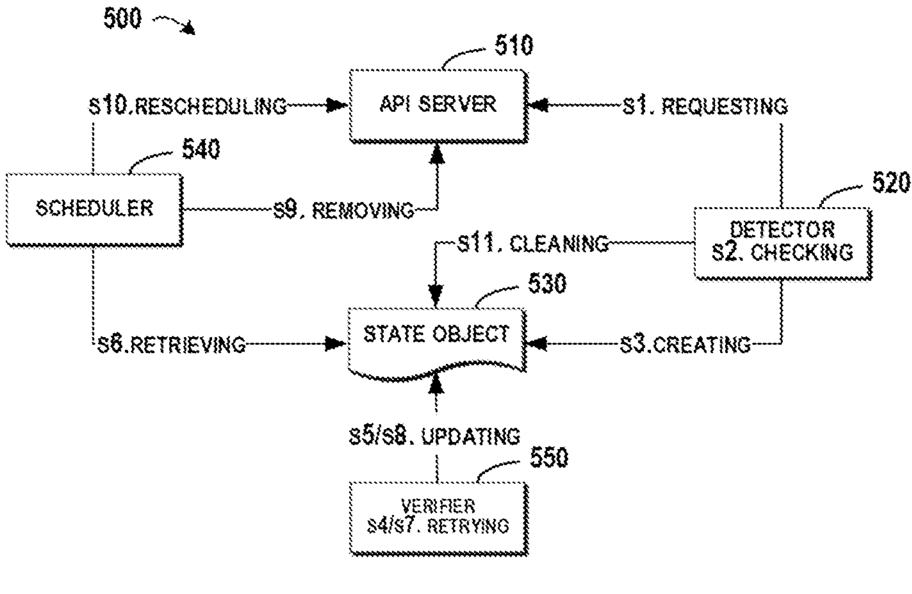
FIG. 5 depicts an example diagram for an architecture for service update management according to embodiments of the present invention.
FIG. 6 depicts an example diagram for a dependency management phase during service update according to embodiments of the present invention.

At this point, the developing engineer has to check the update procedures for both of the service A 410 and service B 420. For example, the engineer has to manually determine whether there is a dependency relationship between the two services and find the reason for the failure in the update. Once the engineer finds the failure is caused by a shortage of available resources in the computing system 400, he/she may manually reschedule the resource allocation in the computing system 400 for continuing the update. However, the manual labor greatly increases the engineer's workload and leads to a longer time overhead In view of the above drawbacks, embodiments of the present invention provide an effective solution for service update management. Reference will be made to FIG. 5 for a brief of the present invention, here FIG. 5 depicts an example diagram for an architecture of system 500 for service update management according to embodiments of the present invention. Here, the system 500 may be implemented in the computing system 400. Alternatively, and/or in addition to, the system 500 may also be implemented in a different location other than the computing system 400.

In FIG. 5, a detector 520, a scheduler 540 and a verifier 550 may be provided in the system 500. Generally, the detector 520 may monitor the services for a failed state (also referred to as a first state) and analyze reasons that cause the failed state. For example, if the reason is that the dependent services have not been updated due to the lack of resources, the detector 520 may further identify dependent services. Then the scheduler 540 may suspend the failed service, release resources that have been allocated to the failed service and then allocate the released resource to the dependent services. Further the verifier 550 may monitor whether the dependent service is finished when the dependent service is allocated with the released resources. Once the dependent service is finished, the update procedure for the suspended service may continue. With these embodiments, failures during the update procedures for the services may be automatically detected and removed based on a dependency relationship between the services. Therefore, performance of the update procedures may be increased.

Hereinafter, the above architecture will be described by taking the services of FIG. 4 as examples. In a step S1, the detector 520 may check the states of both service A 410 and the service B 420. For example, the detector 420 may request an API server 510 in the computing system 400 for related states, and then the API server 510 may return all the requested states, among which a state may indicate that the service B 420 is in a failed state. In the embodiments of the present invention, the service A 410 and the service B 420 may be provided in the Kubernetes architecture, and thus the failed state may specifically refer to the CrashLoopBackOff state in the Kubernetes architecture. With these embodiments, failures for services that are developed based on the Kubernetes architecture may be automatically detected without complicated manual labors by developing engineers. Here, CrashLoopBackOff is just an example for the failed state, and in another architecture, a different flag other than CrashLoopBackOff may indicate the failed state.

In a step S2, the detector 520 may check additional information from logs of the computing system 400, implement network traffic analysis and/or other information for detecting service dependencies dynamically. For example, the detector 520 may find that the failure of the service B 420 is caused by the service A 410 on which the service B 420 depends. Specifically, the detector 520 may find that the service A 410 is waiting for resources to be allocated by the computing system 400. In other words, the update procedure for the dependent service A 410 is stopped because it does not have enough resource for implementing the update procedure.

In some embodiments of the present invention, each of the dependent service A 410 and the failed service B 420 may include a plurality of instances, and thus the detector 520 may monitor the state for each service by checking states of all the related instances. For example, the detector 520 may find that the failed instance 428 leads to the failure of the service B 420, and the failed instance 428 is caused by that the new pending instance 418 in the service A 410 is waiting for resources.

Once the cause for the failed state is found, the service B 420 may be suspended, and resources that are allocated to update procedure for the service B 420 may be released. Specifically, in a step S3, the detector 520 may create a state object for storing related information of the service B 420. In the Kubernetes architecture, a DependentService CRD (Custom Resource Definition) object may be created. Here, the CRD object represents a data structure provided by the Kubernetes architecture that allows customers to extend. The state object may include various aspects of the failed service, such as the state of the failed service (the CrashLoopBackOff state), dependent service(s) of the failed service, and state of the dependent service (initially may be set to NULL). In embodiments of the present invention, the state object may have the following data structure as shown in Table 1.

TABLE 1

Example Data Structure of State Object

| Line No. | Description |
|---|---|
| 1 | DependentServices CRD object |
| 2 | { |
| 3 | deployment: B, |
| 4 | dependent service: |
| 5 | {(service: A, |
| 6 | state: “”} |
| 7 | } |

In Table 1, line 1 indicates a header of the state object, and lines 2 to 7 indicate a body of the state object. Specifically, line 3 indicates that the current state object relates to the failed service B; lines 4-6 indicate that the service B depends on the service A, and by now the state of the dependent service A is set to unknown (NULL). Here, the state of the dependent service may be periodically updated by the verifier 550 based on whether the dependent service is finished. In a step S4, the verifier 550 may retry the service A to see whether the service may be accessed.

It is to be understood that the above Table 1 is just an example state object in the Kubernetes architecture. When the services are implemented in another architecture that supports a dependency relationship between services, the state object may be created in another data structure. For example, the state object may be stored in a file, parameters that are saved in hardware registers or variables in software programs, and the like. In some embodiments of the present invention, an individual state object may be created for an individual failed service. A state list that including a plurality of state objects may be maintained in the computing system 400 for updating the plurality of services included in the computing system 400. The following paragraphs will provide details related to the state object 530 as an example, and all the state objects in the state list may be subjected to similar operations.

In a step S5, the verifier 550 may update the state of the dependent service A 410. If the dependent service A 410 is executed but not finished, then the state in line 6 of the above Table 1 may be updated from NULL to a state (such as “unavailable”) for indicating that the update procedure of the dependent service is executing. Here, the unfinished state is different from the above failed state for the service B and is also referred to as a second state. If the dependent service is finished, then the state in line 6 of the above Table 1 may be further updated from “unavailable” to a state (such as “available”) for indicating that the update procedure of the dependent service is finished. Similarly, the finished state is different from the above failed state and the unfinished state and is also referred to as a third state. Here, the steps S4 and S5 may be triggered, for example by a timer, periodically for the verifier 550 to obtain the latest state for the dependent service dynamically. With these embodiments, the state of the dependent service may provide an easy and effective way for determining whether the dependent service has been updated to the latest version. Therefore, a state change of the dependent service from the second state to the third state may trigger the suspended service to be recovered to a normal state.

The scheduler 540 may monitor the state of the dependent service by retrieving information from the state object 530.

In a step S6, the scheduler 540 may retrieve the state in line 6 of the Table 1 to see whether the dependent service is finished. If the state indicates the unfinished state (i.e., the second state), then the service B 420 may still be suspended. During operations of the computing system 400, a plurality of procedures may be implemented and usually these procedures are managed in a queue for scheduling the resource allocation. Here, the queue may be managed by the API server 510 or another module in the computing system 400. For example, the plurality of procedures may be added to an end of the queue according to a chronological order or another order, and resources may be allocated to the procedure in the queue for implementing. Once the procedure is finished, the allocated resources may be released and the procedure may be removed from the queue.

In some embodiments of the present invention, a specific flag may be set for the service B 420 for indicating the suspending. Here, the update procedure for the service B 420 may be added into the queue and may wait for resource to be allocated to for implementing. Once the scheduler 540 finds that the service A 410 on which the failed service B 420 depends is not finished after retrieving the state from the state object 530, the scheduler 540 may assign a suspending flag to the update procedure for the failed service B 420. At this point, the update procedure for the failed service B 420 may be bypassed in the queue and resources may be allocated to a next procedure that follows the update procedure for the failed service B 420. As the failed service B 420 is suspended, the suspended service B 420 does not need the allocated resources anymore, and the resources allocated to the service B 420 may be released and then allocated to other procedures.

In some embodiments of the present invention, the released resources may be allocated to the dependent service A 410 that is waiting for resources. Once the dependent service A 410 has enough resources, the update procedure for the dependent service A 410 may be implemented. Specifically, in a step S7, the verifier 550 may retry the dependent service A 410. The update procedure for the dependent service A 410 may last for a certain time length, and the service A 410 may become available after the update procedure for the dependent service A 410 is finished. Once the verifier 550 accesses the service A 410 successfully, in a step S8, the verifier 550 may update the state for the dependent service to the available state. With these embodiments, once the dependent service turns into the available state, it indicates that the update process of the dependent service is finished and then resources allocated to the update procedure for the dependent service may be released. At this point, the computing system 400 has enough resources to allocate to the update procedure of the service B 420. Therefore, the time point for recovering the update procedure of the service B 420 may be determined effectively and automatically.

In FIG. 5, the scheduler 540 may periodically retrieve the state for the dependent service from the state object 530, so as to determine whether the suspending flag should be removed from the update procedure for the failed service B 420. If the state indicates the finished state, the service B 410 may be recovered from the suspended state to a normal state. In a step S9, the scheduler 540 may remove the suspending flag and then the update procedure may become a normal procedure and can wait for resource allocation. At this point, in a step S10, the API server 510 may reschedule the queue and allocate resources to the update procedure for the failed service B 420. Further, enough resources may be allocated to the update procedure for the service B 420 and thus the update procedure for the service B 420 may be implemented successfully. By now, the update procedures for both services are finished, and then the state object 530 for recording updating states is of no use anymore. Further, in a step S11, the state object 530 may be removed from the computing system 400.

In some embodiments of the present invention, the service A 410 and the service B 420 may be managed in a level of instances. Continuing the example where both services include a plurality of instances, returning to FIG. 4, resources allocated to the failed instance 428 in the failed service B 420 may be released and allocated to the new pending instance 418 in the dependent service A 410. With these embodiments, the service may be managed in a level of the instance, which provides an accurate way for the service update management.

Once the new pending instance 418 is implemented, the update procedure for the dependent service A 410 may be finished and then the dependent service A 410 becomes available. Further, the update procedure for the service B 420 may continue and then the service B 420 becomes available. By now, all the services are updated in the computing system 400. With embodiments of the present invention, the system 500 may monitor the service update procedures in an automatic way and thus the engineer does not need to manually detect failures during service update.

In some embodiments of the present invention, the computing system 400 may be a developing environment, and resources of the computing system 400 are not enough for supporting both of the first update procedure and the second update procedure which have a dependency relationship. Usually, resources in the developing environment are limited and the resources are enough for normal development work. However, the service update procedures may cost about twice as many resources as normal operation, and thus the problem of insufficient resources often occurs in the developing environment. With these embodiments, the developing engineer can implement the above service update management for automatically detecting failures caused by the insufficient resource allocation to the dependent service. Therefore, the heavy manual labor of the developing engineer is reduced, and the performance of the service update procedures may be improved.

The above paragraphs have described a general description for managing the service update, hereinafter, reference will be made to FIGS. 6 to 9 for more details during the service update management. FIG. 6 depicts an example diagram 600 for a dependency management phase during service update according to embodiments of the present invention. In FIG. 6, the detector 520 may request 610 the API server 510 to provide states about the service A 410 and service B 420. Further, the detector 520 may check the returned states and detect 620 that the service B 420 is failed. The detector 520 may find 630 the service A 410 on which the service B 420 depends is waiting for the computing system 400 to allocate resources and determines that the failed service B 420 is caused by the dependent service A 410.

In some embodiments of the present invention, the detector 520 may detect the failure based on the instance level. Specifically, the detector 520 may find that the new pending instance 418 (which is waiting for resource allocation) causes the failed instance 428, which in turn results in the failed service B 420. With these embodiments, the services may be managed in the instance level and thus the preference of the service update may be controlled in a more accurate and effective way.

Once the dependent service 410 is found, the detector 520 may create 640 a state object 530 for storing information about the failed service B 420 and the corresponding dependent service A 410. In some embodiments of the present invention, the state object 530 may be created according to the data structure as shown in Table 1 in the Kubernetes architecture. At the beginning, the state of the dependent service A 410 may be set to NULL.

Figure 7:
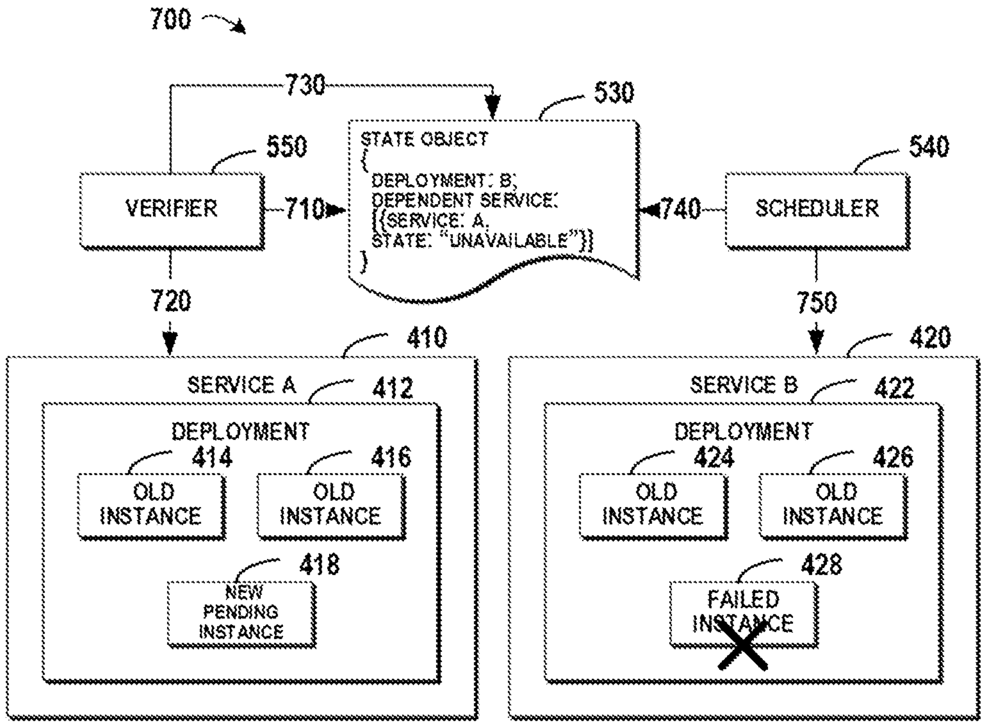
FIG. 7 depicts an example diagram for a dependency management phase during service update according to embodiments of the present invention.

FIG. 7 depicts an example diagram 700 for a dependency management phase during service update according to embodiments of the present invention, where the example diagram 700 relates to a next time point following the example diagram 600. In FIG. 7, the verifier 550 may set 710 the state for the dependent service A 410 in the state object 530 to "unavailable" as the dependent service A 410 is still waiting for resources and not executed. The verifier 550 may retry 720 the dependent service A 410 periodically, and then may update 730 the state object 530 based on a latest state of dependent service A 410. Meanwhile, the scheduler 540 may retrieve 740 the state of the dependent service A 410 and determine whether to continue the suspended failed service B 420.

Here, a change in the latest state of the dependent service A 410 may be caused by the resource reallocation. After the failed service B 420 is suspended, resources that are allocated to the failed service B 420 may be released and reallocated to the dependent service A 410. Specifically, the failed instance 428 in FIG. 7 may be identified with the specific suspending flag and resources allocated to the failed instance 428 may be reallocated to the new pending instance 418. At this point, the new pending instance 418 may have enough resources for implementation. Once the new pending instance 418 is finished, the update procedure for the dependent service A 410 is finished and then the dependent service A 410 becomes available.

Figure 8:
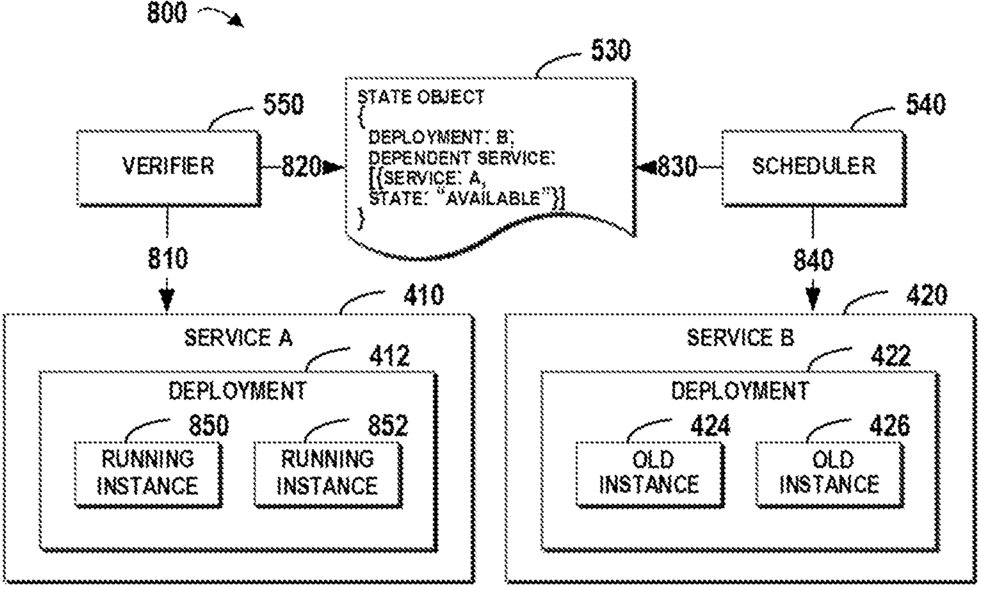
FIG. 8 depicts an example diagram for a dependency management phase during service update according to embodiments of the present invention.

FIG. 8 depicts an example diagram 800 for a dependency management phase during service update according to embodiments of the present invention, where the example diagram 800 relates to a next time point following the example diagram 700. In FIG. 8, the verifier 550 may retry 810 the service A 410 and find that the dependent service A 410 is available, then the verifier 550 may update 820 the state of the dependent service in the state object 530 to "available." As shown in FIG. 8, the new pending instance 418 in the service 410 in FIG. 7 is finished, then the old instances 414 and 416 are replaced with running instances 850 and 852, respectively. At this point, the service A 410 is successfully updated, and all the resources allocated to the dependent service A 410 may be released. Accordingly, available resources in the computing system 400 become rich, and then the suspended failed service B 420 may be continued with the available resources.

The scheduler 540 may retrieve 830 the state "available" from the state object 530, then the scheduler 540 may remove 840 the suspending flag for the suspended failed service B 420. Once the suspending flag is removed, the old instances 424 and 426 in the service B 420 may be allocated with resources for implementation.

Figure 9:
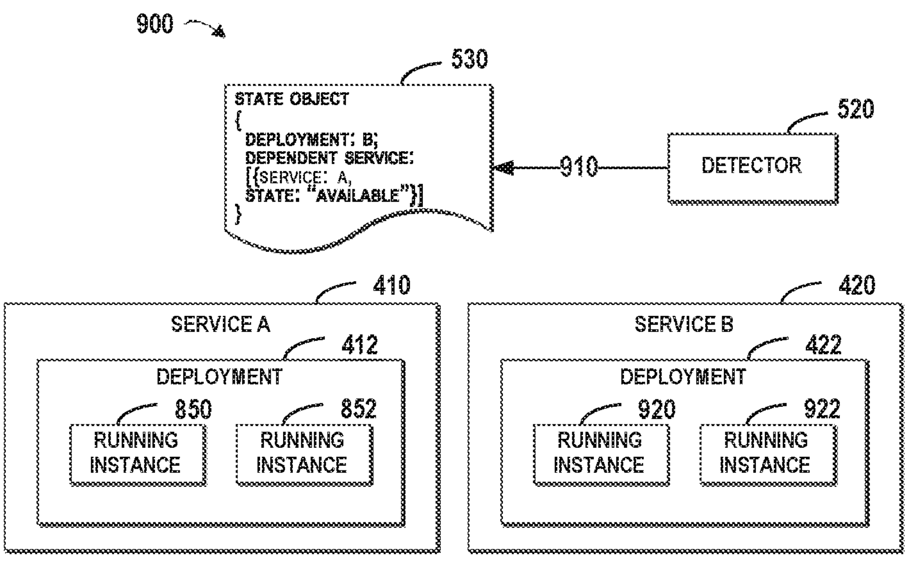
FIG. 9 depicts an example diagram for a dependency management phase during service update according to embodiments of the present invention.

FIG. 9 depicts an example diagram for a dependency management phase during service update according to embodiments of the present invention where the example diagram 900 relates to a next time point following the example diagram 800. In FIG. 9, the old instances 424 and 426 in the service B 420 may be implemented and replaced with running instance 920 and 922. At this point, the update procedure for the service B 420 is also finished and thus both of the service A 410 and service 420 have the updated version. Further, the detector 520 may remove 910 the state object 530 which is for facilitating the update procedure.

FIGS. 6 to 9 show the service update management for updating the application system 405 including two services. In other embodiments, the above service update management may also be applied to another application system including more than two services. With these embodiments, failures during the update procedures for the services may be automatically detected and removed based on a dependency relationship between the services. Therefore, performance of the update procedures may be increased.

Figure 10:
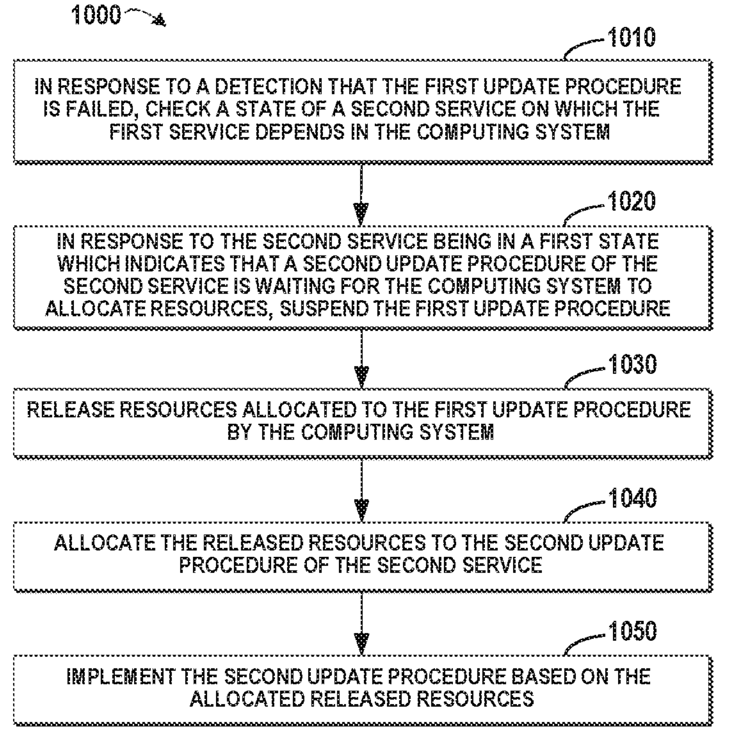
FIG. 10 depicts an example flowchart of a method for service update management according to embodiments of the present invention.

Hereinafter, reference will be made to FIG. 10 for more details about embodiments of the present invention. FIG. 10 depicts an example flowchart of a method 1000 for service update management according to embodiments of the present invention. Here, the method 1000 may be implemented by one or more processors during a first update procedure for a first service (such as the service B 420) in a computing system 400. At a block 1010, in response to a detection that the first update procedure is failed, one or more processors may check a state of a second service (such as the service A 410) on which the first service depends in the computing system 400. At a block 1020, in response to the second service being in a first state which indicates that a second update procedure of the second service is waiting for the computing system 400 to allocate resources, one or more processors may suspend the first update procedure. At a block 1030, one or more processors may release resources allocated to the first update procedure by the computing system 400. At a block 1040, one or more processors may allocate the released resources to the second update procedure of the second service. At a block 1050, one or more processors may implement the second update procedure based on the allocated released resources.

In some embodiments of the present invention, in order to implement the second update procedure based on the allocated released resources, in response to the second update procedure being executed but not finished, one or more processors may update the state of the second service to a second state which indicates that the second update procedure of the second service is executing. In some embodiments of the present invention, in response to the second update procedure being finished, one or more processors may update the state of the second service to a third state which indicates that the second update procedure of the second service is finished.

In some embodiments of the present invention, in response to the second service being in the second state, one or more processors may continue suspending the first update procedure. In some embodiments of the present invention, in response to the second service being in the third state, one or more processors may allocate resources to the first update procedure of the first service; and one or more processors may continue the first update procedure based on the allocated resources.

In some embodiments of the present invention, the first and second services may be developed based on a Kubernetes architecture, and the second service may be provided by at least one instance that is defined in a Kubernetes deployment of the second service.

In some embodiments of the present invention, the first state may further comprise a state which indicates that at least one instance of the second service is waiting for the computing system 400 to allocate resources.

In some embodiments of the present invention, in order to allocate the released resources to the second service, one or more processors may allocate the released resources to the at least one instance of the second service.

In some embodiments of the present invention, the computing system 400 may be provided in a developing environment, and resources of the computing system 400 may be not enough for supporting both of the first update procedure and the second update procedure.

In another aspect of the present invention, there is provided a computer-implemented system. The computer-implemented system comprises a computer processor coupled to a computer-readable memory unit, where the memory unit comprises instructions that when executed by the computer processor implements the above method 1000.

In another aspect of the present invention, there is provided a computer program product. The computer program product comprises a computer readable storage medium having program instructions embodied therewith. The program instructions are executable by an electronic device to cause the electronic device to perform actions of the above method 1000.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or so on, and procedural programming languages, such as the "C" programming language or similar programming languages. The computer readable program instructions may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

during a first update procedure for a first service in a computing system, utilizing a detector to request an application programming interface (API) server to provide states about the first service and a second service;

in response to a detection that the first update procedure is failed, checking, by one or more processors, a state of the second service on which the first service depends in the computing system;

creating, by the detector, a state object for tracking a status of services undergoing updates and storing information about the failed first update procedure for the first service and its corresponding dependent service;

triggering, by a timer, periodically the detector to obtain a latest state for the corresponding dependent service dynamically by retrying the corresponding dependent service and updating a state of the corresponding dependent service in the state object based on a latest state;

in response to the second service being in a first state which indicates that a second update procedure of the second service is waiting for the computing system to allocate resources, suspending, by the one or more processors, the first update procedure;

releasing, by the one or more processors, resources allocated to the first update procedure by the computing system;

allocating, by the one or more processors, the released resources to the second update procedure of the second service;

implementing, by the one or more processors, the second update procedure based on the allocated released resources;

monitoring, by the one or more processors, whether the second update procedure of the second service is finished when the released resources are allocated; and continuing, by the one or more processors, the first update procedure once the second update procedure of the second service is finished.

2. The method of claim 1, wherein implementing the second update procedure based on the allocated released resources further comprises:

in response to the second update procedure being executed but not finished, updating, by the one or more processors, the state of the second service to a second state which indicates that the second update procedure of the second service is executing; and in response to the second update procedure being finished, updating, by the one or more processors, the state of the second service to a third state which indicates that the second update procedure of the second service is finished.

3. The method of claim 2, further comprising:

in response to the second service being in the second state, continuing, by the one or more processors, suspending the first update procedure;

in response to the second service being in the third state, allocating, by the one or more processors, resources to the first update procedure of the first service; and continuing, by the one or more processors, the first update procedure based on the allocated resources.

4. The method of claim 1, wherein the first and second services are developed based on a Kubernetes architecture, and the second service is provided by at least one instance that is defined in a Kubernetes deployment of the second service.

5. The method of claim 4, wherein the first state further comprises a state which indicates that at least one instance of the second service is waiting for the computing system to allocate resources.

6. The method of claim 5, wherein allocating the released resources to the second service comprises: allocating, by the one or more processors, the released resources to the at least one instance of the second service.

7. The method of claim 1, wherein the computing system is provided in a developing environment, in which resources of the computing system are not enough for supporting both the first update procedure and the second update procedure.

8. A computer-implemented system, comprising a computer processor coupled to a computer-readable memory unit, the memory unit comprising instructions that when executed by the computer processor implements a method comprising:

during a first update procedure for a first service in a computing system, utilizing a detector to request an application programming interface (API) server to provide states about the first service and a second service;

in response to a detection that the first update procedure is failed, checking, by one or more processors, a state of the second service on which the first service depends in the computing system;

creating, by the detector, a state object for tracking a status of services undergoing updates and storing information about the failed first update procedure for the first service and its corresponding dependent service;

triggering, by a timer, periodically the detector to obtain a latest state for the corresponding dependent service dynamically by retrying the corresponding dependent service and updating a state of the corresponding dependent service in the state object based on a latest state;

in response to the second service being in a first state which indicates that a second update procedure of the second service is waiting for the computing system to allocate resources, suspending the first update procedure;

releasing resources allocated to the first update procedure by the computing system;

allocating the released resources to the second update procedure of the second service;

implementing the second update procedure based on the allocated released resources;

monitoring whether the second update procedure of the second service is finished when the released resources are allocated; and continuing the first update procedure once the second update procedure of the second service is finished.

9. The system of claim 8, wherein implementing the second update procedure based on the allocated released resources further comprises:

in response to the second update procedure being executed but not finished, updating the state of the second service to a second state which indicates that the second update procedure of the second service is executing; and in response to the second update procedure being finished, updating the state of the second service to a third state which indicates that the second update procedure of the second service is finished.

10. The system of claim 9, wherein the method further comprises:

in response to the second service being in the second state, continuing suspending the first update procedure;

in response to the second service being in the third state, allocating resources to the first update procedure of the first service; and continuing the first update procedure based on the allocated resources.

11. The system of claim 8, wherein the first and second services are developed based on a Kubernetes architecture, and the second service is provided by at least one instance that is defined in a Kubernetes deployment of the second service.

12. The system of claim 11, wherein the first state further comprises a state which indicates that at least one instance of the second service is waiting for the computing system to allocate resources.

13. The system of claim 12, wherein allocating the released resources to the second service comprises: allocating the released resources to the at least one instance of the second service.

14. The system of claim 8, wherein the computing system is provided in a developing environment, in which resources of the computing system are not enough for supporting both the first update procedure and the second update procedure.

15. A computer program product, the computer program product comprising a computer readable storage medium having program instructions embodied therewith, the program instructions executable by an electronic device to cause the electronic device to perform a method, the method comprises:

during a first update procedure for a first service in a computing system, utilizing a detector to request an application programming interface (API) server to provide states about the first service and a second service;

in response to a detection that the first update procedure is failed, checking, by one or more processors, a state of the second service on which the first service depends in the computing system;

creating, by the detector, a state object for tracking a status of services undergoing updates and storing information about the failed first update procedure for the first service and its corresponding dependent service;

triggering, by a timer, periodically the detector to obtain a latest state for the corresponding dependent service dynamically by retrying the corresponding dependent service and updating a state of the corresponding dependent service in the state object based on a latest state;

in response to the second service being in a first state which indicates that a second update procedure of the second service is waiting for the computing system to allocate resources, suspending the first update procedure;

releasing resources allocated to the first update procedure by the computing system;

allocating the released resources to the second update procedure of the second service;

implementing the second update procedure based on the allocated released resources;

monitoring whether the second update procedure of the second service is finished when the released resources are allocated; and continuing the first update procedure once the second update procedure of the second service is finished.

16. The computer program product of claim 15, wherein implementing the second update procedure based on the allocated released resources further comprises:

in response to the second update procedure being executed but not finished, updating the state of the second service to a second state which indicates that the second update procedure of the second service is executing; and in response to the second update procedure being finished, updating the state of the second service to a third state which indicates that the second update procedure of the second service is finished.

17. The computer program product of claim 16, wherein the method further comprises:

in response to the second service being in the second state, continuing suspending the first update procedure;

in response to the second service being in the third state, allocating resources to the first update procedure of the first service; and continuing the first update procedure based on the allocated resources.

18. The computer program product of claim 15, wherein the first and second services are developed based on a Kubernetes architecture, and the second service is provided by at least one instance that is defined in a Kubernetes deployment of the second service.

19. The computer program product of claim 18, wherein the first state further comprises a state which indicates that at least one instance of the second service is waiting for the computing system to allocate resources.

20. The computer program product of claim 19, wherein allocating the released resources to the second service comprises: allocating the released resources to the at least one instance of the second service, and wherein the computing system is provided in a developing environment, in which resources of the computing system are not enough for supporting both the first update procedure and the second update procedure.

* * * * *